L. C. ORD.
BRAKE.
APPLICATION FILED SEPT. 22, 1911. RENEWED MAY 1, 1915.
1,167,209. Patented Jan. 4, 1916.
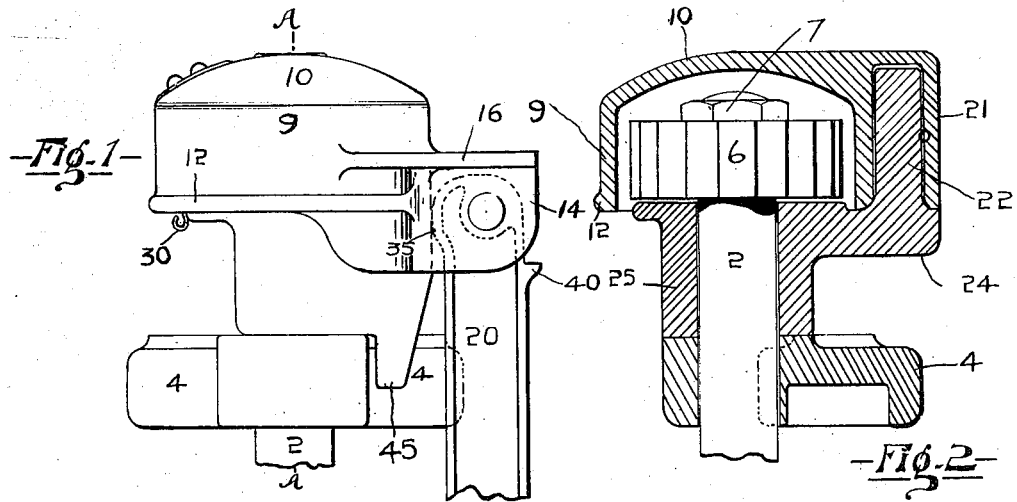
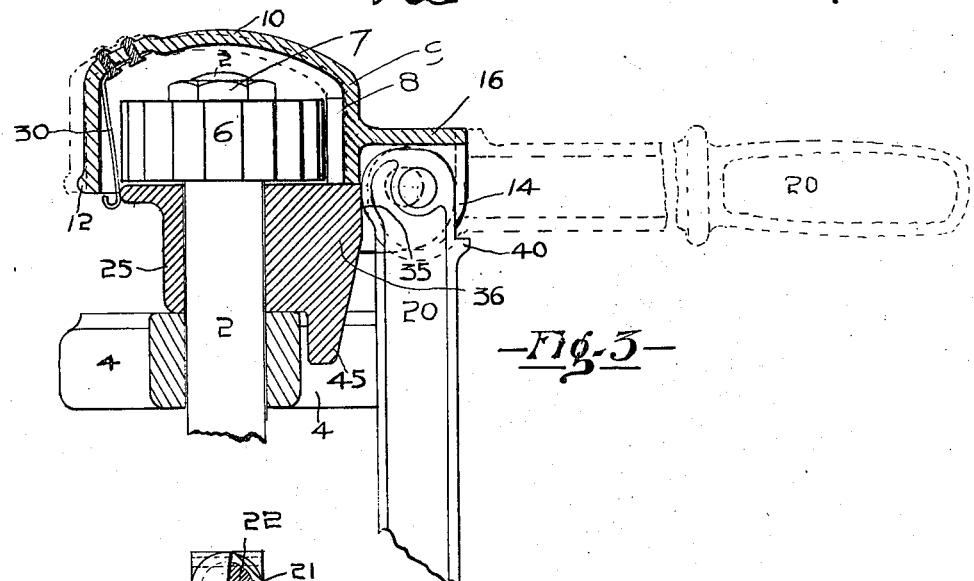
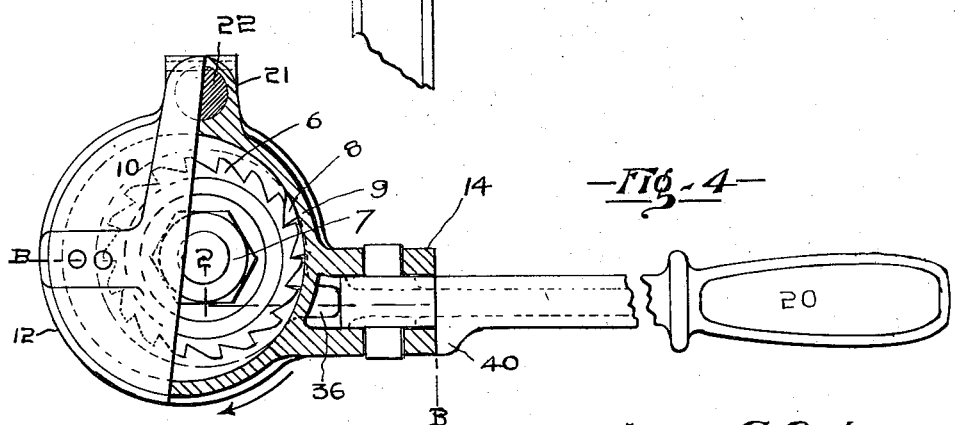
Witnesses
E. R. Pitts
Gordon G. Cooke
Lewis C. Ord
Inventor
per Atty
William P. McKeat

UNITED STATES PATENT OFFICE.

LEWIS C. ORD, OF MONTREAL, QUEBEC, CANADA, ASSIGNOR, BY MESNE ASSIGNMENTS, TO RATCHET BRAKE COMPANY, OF NEW YORK, N. Y., A CORPORATION OF DELAWARE.

BRAKE.

1,167,209.  Specification of Letters Patent.  Patented Jan. 4, 1916.

Application filed September 22, 1911, Serial No. 650,770. Renewed May 1, 1915. Serial No. 25,306.

*To all whom it may concern:*

Be it known that I, LEWIS C. ORD, of the city of Montreal, Province of Quebec, Dominion of Canada, have invented certain new and useful Improvements in Brakes; and I do hereby declare that the following is a full, clear, and exact description thereof.

My invention relates to brake mechanism for cars, such as railway cars, and more particularly to ratchet mechanism whereby a brake staff may be ratcheted forward by a to and fro movement of a suitable handle, and whereby the ratchet mechanism may be disconnected at the proper time to permit said brake staff to revolve freely in the reverse direction to release the brakes.

More particularly the invention is directed to ratchet brake mechanism comprising a ratchet wheel secured to the brake staff, and a pair of members constrained to rotate together about said staff, with teeth for locking said members to the ratchet wheel when the brake staff is to be rotated forwardly to set the brakes, these teeth being movable out of engagement with the ratchet when the staff is to be released for backward rotation to release the brakes. An operating handle is provided for swinging said members about said staff either forward or back. In the embodiment here disclosed the brake setting handle or lever is pivotally mounted to drop down parallel with the brake staff, and in thus dropping may be used to unlatch the pawl teeth on the ratchet and so uncouple the ratchet mechanism to leave the staff free to rotate backward and release the brakes.

In the embodiment disclosed in the drawing, a spring becomes effective when the handle is in distended or horizontal position to yieldingly hold the pawl teeth to the ratchet, so that the pawl teeth may slide backward over the ratchet teeth to get a new grip on the ratchet when the handle is swung backward, the pivotal support for the handle being free to move with the pawl teeth toward and from the ratchet wheel during these backward ratcheting movements of the teeth. For full comprehension, however, of my invention reference must be had to the accompanying drawings forming a part of this specification in which similar reference characters indicate the same parts, and wherein:

Figure 1 is a side elevation of a hand-brake operating mechanism containing my invention; Figs. 2 and 3 transverse vertical sectional views taken on lines A A Fig. 1 and B B Fig. 2 respectively, and Fig. 4 is a plan view of the device.

The vertical brake-shaft 2 is journaled in suitable bearings on the hand-rail and platform and the usual locking pawl and ratchet wheel are located at the platform. The bracket for attachment to the hand rail is indicated at 4 but the other parts, with the exception of the brake-shaft are not shown as they are familiar to those skilled in the manufacture of railway cars.

The upper end of the brake-shaft is diminished and has a ratchet wheel 6 rigidly secured thereon, by a nut 7, and constituting the member in rotative relation with the brake operating mechanism. The pawl for operating this ratchet wheel comprises a series of preferably three teeth 8 formed upon the interior of a cylindrical cap 9, the top of which is of slightly dome formation as at 10 and the rim of which is strengthened by a bead 12. A pair of perforated lugs 14 are formed integrally with and extend laterally from the cap and are stiffened by a horizontal web 16. The operating handle 20 is pivoted at one end between these lugs and has features of construction contributing to the successful operation of the device, to be presently described. A boss 21 formed upon and extending the full depth of the side of the cap has a vertical socket or boring fitting upon a vertical pivot pin 22 preferably cast integrally with a radial arm 24 extending from a supporting member 25 mounted rotatably upon the shaft between the ratchet wheel and hand-rail bracket. This cap and its support, and the parts carried by or formed upon them constitute the manually operated member.

By the above construction and arrangement the cap is adapted to swing across the ratchet wheel to bring the teeth 8 into and out of engagement with the latter; and in order to impart to these members a tendency to come into engagement when free of other superior forces a spring 30 is riveted or otherwise secured to the dome of the cap which is preferably recessed to accommodate it at the diametrical opposite side to the teeth. The handle when hanging in idle position is caused to exert sufficient leverage to overcome the spring and swing the cap to a position with the teeth disengaged from the ratchet wheel, by a cam 35 upon the pivoted end of the handle in position to fulcrum upon a reinforced portion 36 of the side of the supporting member 25 and this cam also affords means for forcing the teeth out of engagement with the ratchet wheel when the brakes are to be released. A lug 40 upon the handle is adapted to engage the web 16 and thus prevent the handle from being lifted above horizontal position; and rotary movement of the supporting member and consequently the cap relatively to the ratchet wheel is limited by a lug 45 extending downwardly from the reinforced portion 36 which is in the proper angular position to come into contact with the hand-rail bracket 4 when the handle is substantially parallel to the hand rail.

The depth of the cap is such that it completely incloses the ratchet wheel and extends downwardly below the top surface of the supporting member thus effectively preventing the entry of water to the wheel and pawl teeth.

*Operation:* Under normal conditions the handle hangs down and retains the cap in an eccentric position relatively to the ratchet wheel and with the teeth disengaged. By lifting the handle to horizontal position the cap is released and it is then moved by the spring to position with the pawl-teeth engaging the ratchet wheel. Movement of the handle in the direction indicated in Fig. 4 rotates the shaft and applies the brakes and in the oscillations necessary to complete the operation the pawl teeth alternately ride over and engage the teeth of the wheel the pivotal relation of the cap to the supporting member permitting of the necessary movement, and when the lever is swung from side to side the cap and supporting member accompany it as a unitary part. In order to release the brakes, the handle is lifted and sufficient power applied in the direction indicated in Fig. 4 to release the usual locking pawl (not shown) which is kicked out of engagement. The operator then allows the brake-mechanism to rotate the brake-shaft in a direction in the reverse to that indicated until the lug 45 engages the stop constituted by the hand-rail bracket 4 thus causing the fulcrum pin 22 to become stationary. Pressure being then exerted on the lever in the direction reverse to that indicated, swings the cap 9 also in a reverse direction to that indicated, thereby disengaging the teeth 8 from the ratchet-wheel, and permitting the latter and the brake-shaft to unwind and the brakes to be released. The brake can also be released by dropping the handle 20, for its cam 35 by engaging with the reinforced portion 36 of the supporting member 25, swings the pawl on its pivotal mounting and frees the ratchet wheel 6.

Although I have illustrated my improved shaft rotating means applied to railway car brake mechanism it may be advantageously applied to other mechanisms requiring the rotation of a shaft without departing from the spirit of my invention.

What I claim is as follows:—

1. In a ratchet brake mechanism, the combination of a brake staff, a ratchet thereon, a supporting member movable about said staff, a pawl pivoted to said supporting member and a drop handle pivoted to said pawl and having a cam for engagement with said supporting member.

2. In a ratchet brake mechanism, the combination of a brake staff, a ratchet thereon, a supporting member adapted to turn about said staff, a pawl pivoted to said supporting member and a drop handle permanently attached to said pawl and adapted when dropped to hold said pawl out of engagement with said ratchet.

3. In a ratchet brake mechanism, the combination of a brake staff, a ratchet thereon, a member adapted to turn about said staff, a pawl pivoted to said member, a drop handle pivoted to said pawl and serving when dropped to release said pawl from said ratchet and a spring normally urging said pawl toward said ratchet.

4. In a ratchet brake mechanism, the combination of a vertical brake staff, a toothed ratchet thereon, a pawl adapted to swing in a horizontal plane into and out of engagement with said ratchet, a drop handle pivoted to said pawl and effective to move it into driving engagement with said ratchet when the brakes are to be set, said handle when dropped serving to release said pawl from said ratchet.

5. In a ratchet brake mechanism, the combination of a brake staff, a toothed ratchet thereon, a supporting member adapted to turn about said staff, a swinging pawl rotatable with said supporting member and a drop handle permanently attached to said pawl and adapted when dropped to hold said pawl out of engagement with said ratchet.

6. In a ratchet brake mechanism, the combination of a vertical brake staff, a ratchet thereon, a supporting member and a pawl member both adapted to turn about said staff, said pawl member having a plurality of teeth for engagement with said ratchet, a spring permitting said teeth to alternately ride over or engage with said ratchet, depending on the direction of rotation, a hand lever pivoted to one of said members and having a cam for engagement with the other member to free the pawl from the ratchet when the handle is dropped, the pivotal support for said handle moving with said pawl member toward and from said ratchet when said pawl member slides backward over the teeth of said ratchet.

7. In a ratchet brake mechanism, the combination of a vertical staff, a ratchet secured to the top of said staff, a supporting member, a pawl constrained to rotate with said supporting member and having teeth movable with respect to said member toward and from said ratchet to permit said teeth to ride backward over said ratchet when a new engagement therewith is to be established, a pivoted drop handle free to move toward and from said ratchet during said movements of the pawl teeth, and a cam on said drop handle effective to withdraw said pawl from engagement with its ratchet when said handle is dropped.

8. In a ratchet brake mechanism, the combination of a vertical staff, a ratchet secured thereto, a pair of members mounted to turn about said staff, a drop handle pivoted to one of said members and having a cam engaging with the other member, one of said members being free to turn in either direction about said staff, and the other member carrying teeth to engage said ratchet and turn said staff, said teeth being movable over said ratchet teeth to permit a backward swing of the operating handle when a new grip on said ratchet is to be secured, a spring controlling said movement and urging said teeth into operative engagement with the ratchet as soon as the backward swing is complete, the pivotal support for said handle moving with said teeth toward and from said ratchet during said backward swing.

9. In a ratchet brake mechanism, the combination of a brake staff, a ratchet secured thereto, a pawl member and a supporting member adapted to turn about said staff, said pawl member carrying a plurality of teeth movable into driving engagement with said ratchet, a drop handle pivoted to one of said members and having a cam face engaging with the other member to control the engagement of said teeth with said ratchet, and a spring permitting said teeth to move backward over said ratchet, the pivotal support for said drop handle moving with said teeth toward and from said ratchet during said backward movement.

10. A shaft rotating means comprising in combination with a shaft to be rotated, of a ratchet wheel mounted rigidly on the shaft, a supporting member mounted rotatably upon the shaft below the ratchet wheel and having a vertical pin eccentric to the ratchet wheel, a member having pawl teeth for engagement with the ratchet teeth and having a socket engaging with said pin, and a drop handle pivoted to said pawl member and having a cam face in position to bear upon the said supporting member when the handle is dropped.

11. A shaft rotating means comprising in combination with the shaft to be rotated, a ratchet wheel mounted rigidly upon the shaft, a supporting member mounted rotatably upon the shaft below the ratchet wheel and having a vertical pin eccentric to the ratchet wheel, a cap inclosing the ratchet wheel and having pawl teeth for engagement with the ratchet wheel, a pair of lateral lugs and a socketed lateral extension for engagement with said pin, a spring between the side of the cap and the supporting member and a drop handle pivoted between said lugs, and having a cam face in position to bear upon the said supporting member when the handle is dropped.

12. In a ratchet brake mechanism, the combination of a brake staff, a bracket for attaching said staff to a car, a ratchet wheel mounted rigidly upon said staff, a supporting member mounted rotatably upon the staff below the ratchet wheel and having a downwardly extending lug for engagement with said bracket, a pivot eccentric to the ratchet wheel, a cap inclosing the ratchet wheel and having pawl teeth upon the interior of one side thereof for engagement with the ratchet wheel and having a lateral extension for engagement with said pivot, and a drop handle pivoted to said cap and having a cam face in position to bear upon the said supporting member when the handle hangs down.

13. In a ratchet brake mechanism, the combination of a brake staff, a bracket for attaching said staff to a car, a ratchet wheel mounted rigidly upon said staff, a supporting member mounted rotatably upon the staff below the ratchet wheel and having a stop lug thereon for engagement with said bracket to limit the backward swing of said member, a cap inclosing said ratchet wheel and pivoted to said supporting member, said cap having pawl teeth upon the interior of one side thereof for engagement with the ratchet wheel, a spring between the side of said cap and the supporting member, and a drop handle pivoted to said cap and adapted to swing the cap about said staff, a complete backward swing of said handle being limited by engagement of said stop lug with said stationary bracket and serving to disengage said pawl teeth from said ratchet.

In testimony whereof I have signed my name to this specification in the presence of two witnesses.

Montreal, September 9th, 1911.

LEWIS C. ORD.

Witnesses:
E. R. PITTS,
GORDON G. COOKE.